United States Patent [19]

Shigetome et al.

[11] Patent Number: 5,483,553
[45] Date of Patent: Jan. 9, 1996

[54] SERIAL DATA TRANSFER APPARATUS

[75] Inventors: Kazuaki Shigetome; Katsunori Suzuki, both of Itami, Japan

[73] Assignees: Mitsubishi Denki Kabushiki Kaisha; Mitsubishi Electric Engineering Company Limited, both of Tokyo, Japan

[21] Appl. No.: 269,513

[22] Filed: Jul. 1, 1994

[30] Foreign Application Priority Data

Jul. 2, 1993 [JP] Japan ..................................... 5-164622

[51] Int. Cl.⁶ .............................. H04L 27/00; H04L 7/00
[52] U.S. Cl. ........................................ 375/256; 375/354
[58] Field of Search .............................. 375/35, 106, 256, 375/354

[56] References Cited

U.S. PATENT DOCUMENTS 4,614,973 9/1986 Sorenson ................................. 375/106
4,964,141 10/1990 Matsushima et al. ................... 375/106

FOREIGN PATENT DOCUMENTS 61-57144 3/1986 Japan ..................................... 375/106
61-182342 8/1986 Japan ..................................... 375/106
2199469 7/1988 United Kingdom ................... 375/106

OTHER PUBLICATIONS

Mitsubishi One–Chip Microcomputer M377202S1FP, M37720S1AFP, User's Manual 2–106–2–147, Jul. 1991.

Primary Examiner—Stephen Chin
Assistant Examiner—Jeffrey W. Gluck
Attorney, Agent, or Firm—Lowe, Price, LeBlanc & Becker

[57] ABSTRACT

A serial data transfer apparatus is provided with a counter 7 for counting the frequency clocks DCLK as the number of clocks of the transfer clocks TCLK, a decoder 8 for detecting the count value CV1 of the counter 7, a transfer interval timer 9 for counting a transfer interval, and with a control circuit 10, wherein the transfer interval timer 9 is made to start counting the frequency clocks DCLK at the time of the last transfer clocks TCLK, i.e., a value of one count before the last count of the counter 7 is detected by the decoder 8. When the transfer interval timer 9 has finished its counting of clock pulses, the control circuit 10 makes the counter 7 start counting the frequency dividing clocks DCLK as well as making the transfer clock output circuit 11 output the next transfer clock TCLK.

2 Claims, 9 Drawing Sheets

FIG. 4A
PRIOR ART
FREQUENCY DIVIDING
CLOCK:DCLK

FIG. 4B
PRIOR ART
COUNT VALUE:CV1

FIG. 4C
PRIOR ART
COUNT VALUE:CV2

FIG. 4D
PRIOR ART
TRANSFER CLOCK:TCLK

FIG. 4E
PRIOR ART
TRANSFER DATA:TD

FIG. 6

FIG. 8A FREQUENCY DIVIDING CLOCK:DCLK
FIG. 8B COUNT VALUE:CV1
FIG. 8C COUNT VALUE:CV2
FIG. 8D TRANSFER CLOCK:TCLK
FIG. 8E TRANSFER DATA:TD

FIG. 9

SERIAL DATA TRANSFER APPARATUS

BACKGROUND OF THE INVENTION

1. Field of the Invention

The present invention relates to a serial data transfer apparatus that converts parallel data to serial data to transfer it. More particularly, the present invention relates to a serial data transfer apparatus provided with a transfer clock generator having an interval control function of a transfer clock used for transferring the data.

2. Description of Related Art

Figure 1:
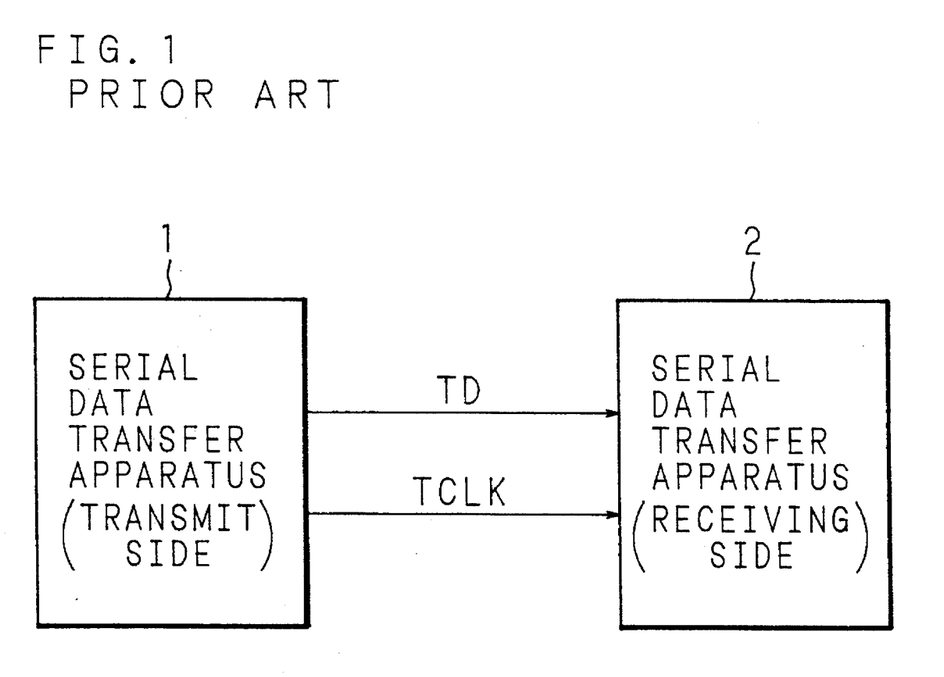
FIG. 1 is a schematic diagram showing an example of a connection between the serial data transfer apparatus at the transmit side and the serial data transfer apparatus at the receiving side.

FIG. 1 is a schematic diagram indicating the state where the serial data transfer apparatuses are connected to each other.

In FIG. 1, reference numeral 1 designates a serial data transfer apparatus at the transmit side, and numeral 2 designates a serial data transfer apparatus at the receiving side. In transferring data, clock pulses TCLK are sent from the serial data transfer apparatus 1 at the transmit side to the serial data transfer apparatus at the receiving side. In synchronism with each transfer clock pulse TCLK, each bit composing the data to be transferred (hereinafter, the data to be transferred to the serial data transfer apparatus 2 at the receiving side from the serial data transfer apparatus 1 at the transmit side is called transfer data TD) is transferred successively.

Figure 2:
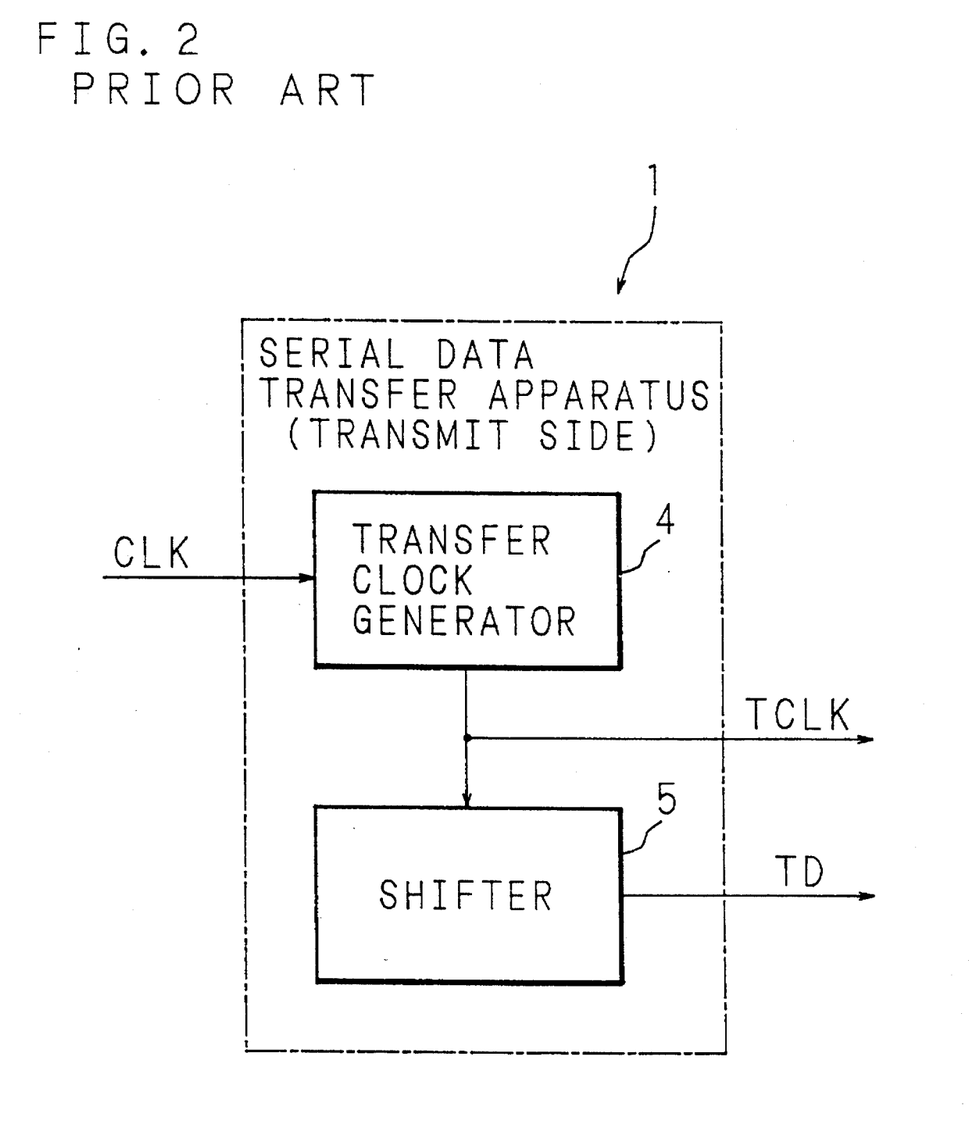
FIG. 2 is a block diagram showing a whole configuration of a conventional serial data transfer apparatus.

FIG. 2 is a block diagram showing a whole configuration of an example of the serial data transfer apparatus 1.

In FIG. 2, reference numeral 4 designates a transfer clock generator, to which reference clock pulses CLK generated in a clock generator (not shown) are inputted for generating the transfer clock pulses TCLK. Numeral 5 designates a shifter, which transmits parallel data as serial data, in that it outputs the data to be transferred bit by bit while shifting it, in synchronism with the transfer clock pulses TCLK generated by the transfer clock generator 4.

Figure 3:
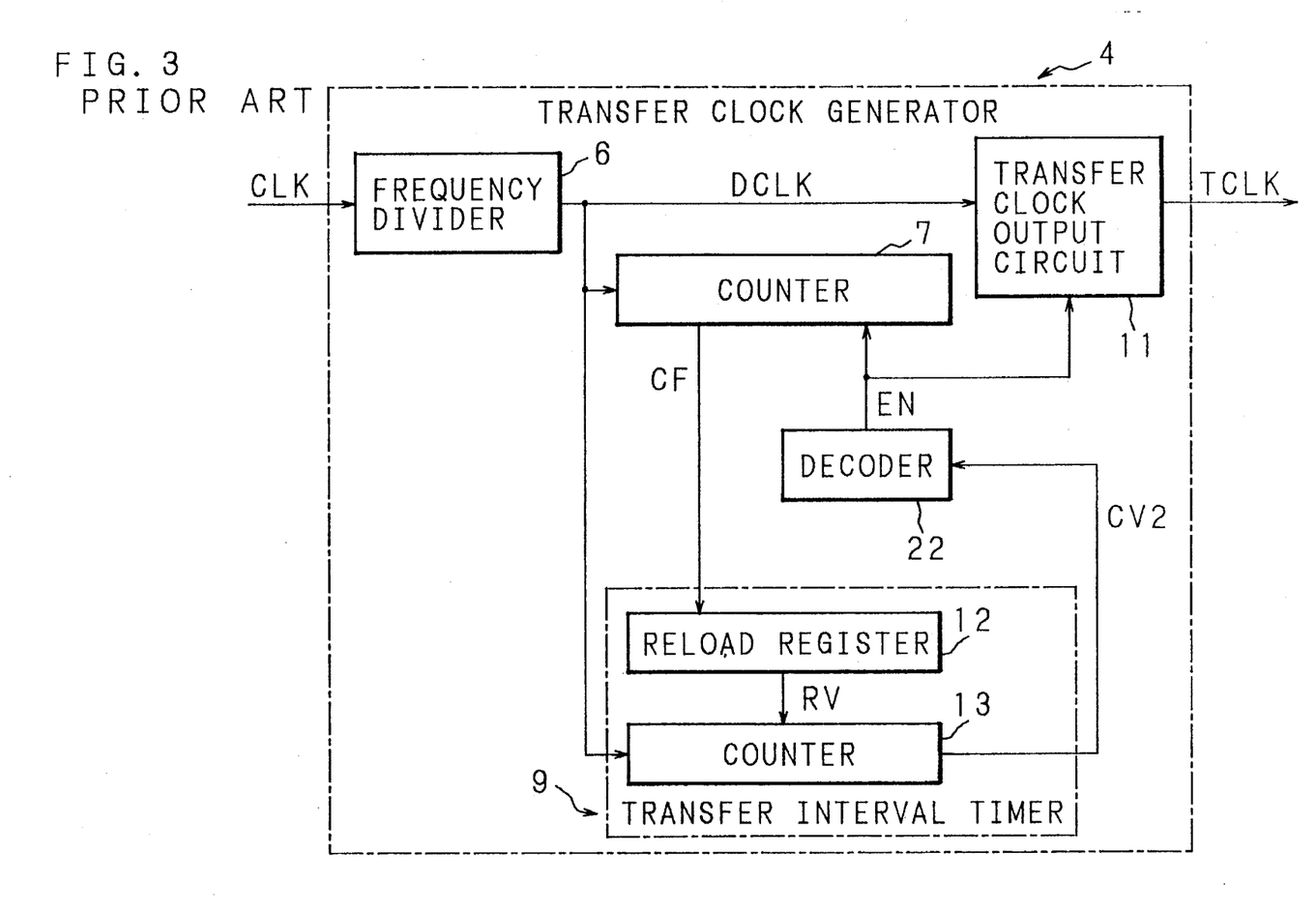
FIG. 3 is a block diagram showing a configuration of essential parts of a conventional serial data transfer apparatus.
Figure 4A:
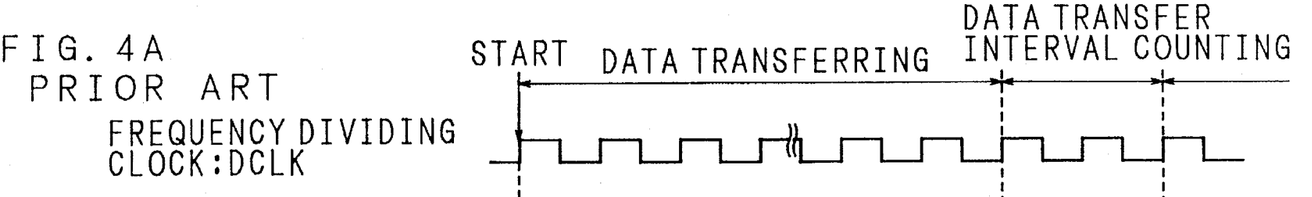
FIGS. 4(a) to 4(e) are timing charts showing an operation example of a conventional serial data transfer apparatus.
Figure 4B:
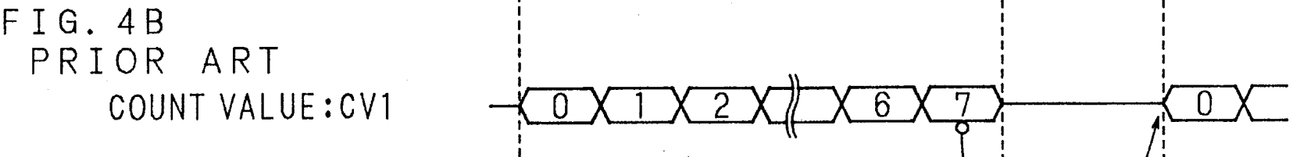
Figure 4C:
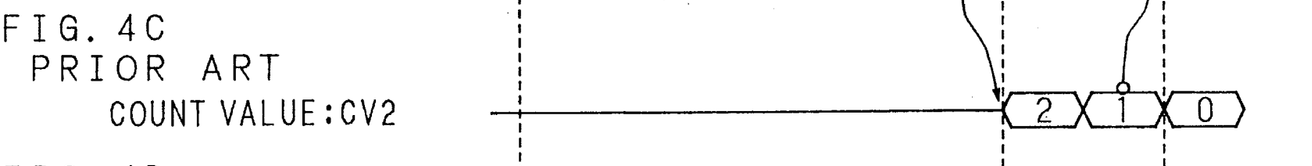
Figure 4D:
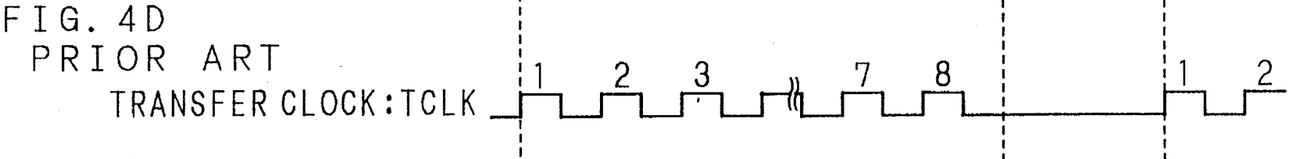
Figure 4E:
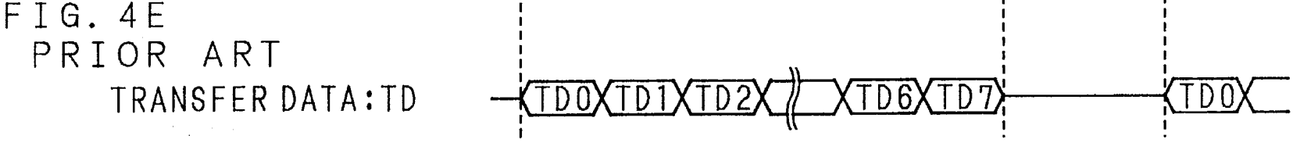
Figure 5A:
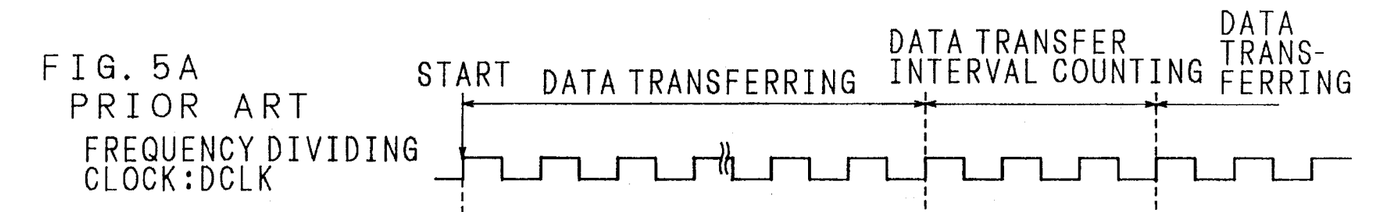
FIGS. 5(a) to 5(e) are timing charts showing another operation example of a conventional serial data transfer apparatus.
Figure 5B:
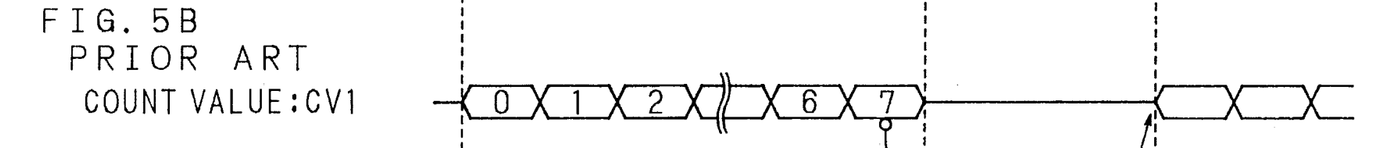
Figure 5C:
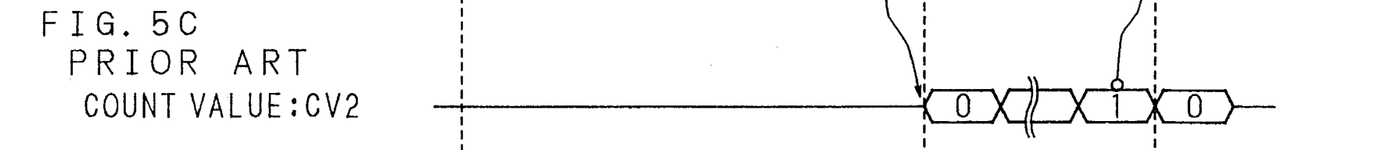
Figure 5D:
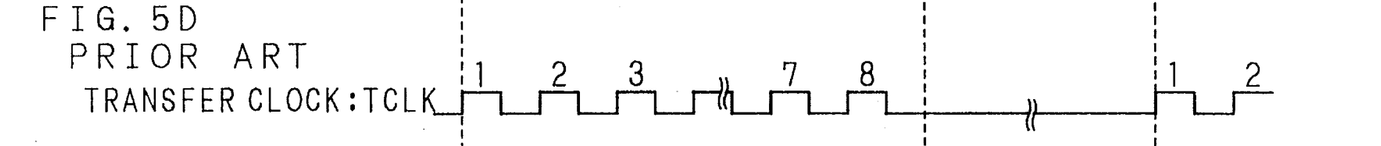
Figure 5E:
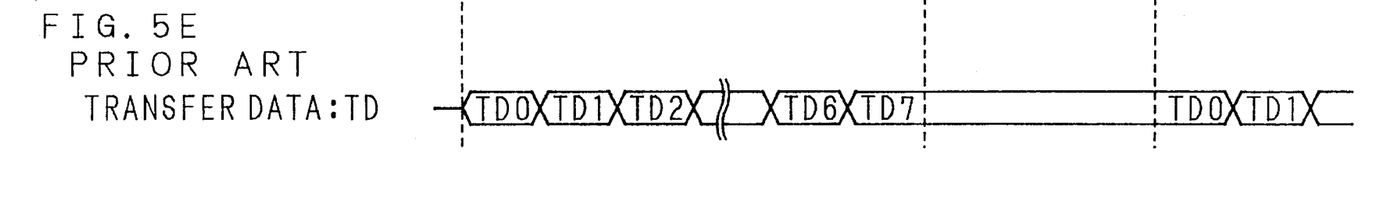

In FIG. 3, essential parts for the transfer clock interval function in the conventional serial data transfer apparatus, that is, a configuration example of the transfer clock generator 4 shown in FIG. 2 is shown.

In addition, the transfer clock interval means the number of clock pulses of frequency dividing clock DCLK during the period between the time after a unit of data is transferred and the time when the next unit of data is transferred.

In FIG. 3, reference numeral 6 designates a frequency divider which inputs the reference clock pulses CLK to divide the frequency of them so as to generate the frequency dividing clock pulses DCLK. The reference clock pulses CLK are generated by a clock generator (not shown). The frequency dividing clock pulses DCLK generated by the frequency divider 6 are supplied to a transfer clock output circuit 11, a counter 7, and a transfer interval timer 9.

The counter 7 counts the frequency dividing clock pulses DCLK, and when the count value reaches a predetermined number, it outputs a count finish signal CF to the transfer interval timer 9.

The transfer interval timer 9 is composed, more specifically, of a reload register 12 and a counter 13. The count finish signal CF outputted from the counter 7 is inputted to the reload register 12 and the frequency dividing clock pulses DCLK outputted from the frequency divider 6 are inputted to the counter 13.

The counter 13 of the transfer interval timer 9 counts the transfer interval of the transfer clock pulses TCLK by counting the frequency dividing clock pulses DCLK. Specifically, the counter 13 of the transfer interval timer 9 is configured as a down counter, and the reload register 12 loads, when given the transfer interval count start signal CS from the counter 7, a reload value RV held in advance to the counter 13. Then the counter 13 of the transfer interval timer 9 counts down with the reload value RV as an initial value, and gives the count value CV2 to a decoder 22.

The decoder 22 decodes the count value CV2 given from the counter 13 of the transfer interval timer 9, and when the count value CV2 reaches a value of one clock pulse before the last count value, that is, "1", the decoder 22 outputs an output enable signal EN which is fed to the transfer clock output circuit 11 and the counter 7.

The transfer clock output circuit 11 outputs the transfer clock pulses TCLK in accordance with the frequency dividing clock pulses DCLK fed from the frequency divider 6 when the output enable signal EN becomes enabled.

In addition, when the output enable signal EN outputted from the decoder 22 is enabled, the counter 7 performs a counting operation.

Next, explanation will be made of the interval control of the transfer clock pulses according to the configuration shown in the aforementioned FIG. 3, referring to timing charts in FIGS. 4(a) to 4(e) and FIGS. 5(a) to 5(e).

In the timing charts in FIGS. 4(a) to 4(e) and FIGS. 5(a) to 5(e), reference character DCLK shows the waveform of the frequency dividing clock pulses DCLK, CV1 the count value of the frequency dividing clock pulses DCLK by the counter 7, CV2 the count value of the frequency dividing clock pulses DCLK by the counter 13 of transfer interval circuit 9, TCLK the waveform of the transfer clock pulses and TD the transfer data, respectively.

Here, it is assumed that the transfer data TD is $2^n$ bits, the counter 7 a $2^n$ base counter of length n-bits and the counter 13 of the transfer interval timer 9, a $2^m$ base counter of length m-bits and is given the reload value from the reload register 12 to which setting of the reload value RV is variable. In this case, when the transfer interval value of the transfer clock pulses TCLK, that is, the reload value RV to be loaded to the counter 13 from the reload register 12 is assumed to be "x", the counting by the counter 13 of the transfer interval timer 9 is finished after the number of (x+1) clock pulses.

In the following, explanation will be made with the assumption that the counter 7 is an 8-clock counter of length 3 bits, and the counter 13 of the transfer interval timer 9 is a down counter.

At first, explanation will be made on the case where the transfer interval is "2", referring to the timing charts in FIGS. 4(a) to 4(e).

Counting of the frequency dividing clock pulses DCLK is started by the counter 7, and the transfer clock pulses TCLK are outputted from the transfer clock output circuit 11. Since the counting of the counter 7 counts from "0" and finishes at "7", the count finish signal CF, indicating the count finish, is outputted from the counter 7 to the transfer interval timer 9.

In the transfer interval timer 9, when the count finish signal CF is inputted to the reload register 12, "2" is loaded as a reload value to the counter 13 from the reload register 12. Thereby, the counter 13 starts counting the transfer interval value from the next clock pulse of the frequency dividing clock pulses DCLK.

In this case, the count value CV2 of the counter 13 of the transfer interval timer 9 is counted down from "2" to "0", and these values are always given to the decoder 22. The decoder 22 always decodes the count value CV2 of the counter 13 of the transfer interval timer 9. When the count value becomes "1", the decoder detects the fact, and makes the output enable signal EN become enabled.

By the fact that the output enable signal EN is enabled, the counter 7 starts counting from the next clock pulse of the frequency dividing clock pulses DCLK, and the transfer clock output circuit 11 starts outputting the transfer clock pulse TCLK.

In the same way, referring to the timing charts in FIGS. 5(a) to 5(e), explanation will be made on the case where the transfer clock pulses TCLK are outputted continuously.

At first, the counter 7 counts the frequency dividing clock pulses DCLK. When it is finished, the output enable signal EN, indicating the count finish, is outputted to the transfer interval timer 9.

In the transfer interval timer 9, when the count finish signal CF is inputted to the reload register 12, "0" is loaded as a reload value RV to the counter 13 from the reload register 12. This enables the counter 13 to start counting the transfer interval value from the next clock pulse of the frequency dividing clock pulses DCLK.

In this case, since the count value CV2 of the counter 13 of the transfer interval timer 9 is counted down from "0", the transfer clock output circuit 11 immediately has to output the next clock pulse of the transfer clock pulses TCLK. However, since the decoder 22 is so constructed as to detect that the count value CV2 of the transfer counter 13 is "1" to make the output enable signal EN become enabled, it cannot realize the transfer clock cycle of such a transfer interval "0".

The conventional serial data transfer apparatus is so constructed, as above, that the count value CV2 of the counter 13 of the transfer interval timer 9 is detected one clock pulse before the count finish so as to start outputting of the next clock pulse of the transfer clock pulses TCLK. Therefore, it has been impossible to make the interval of the transfer clock pulses TCLK "0", that is, to make the transfer clock pulses TCLK output continuously. In order to realize the continuous output of the transfer clock pulses TCLK, means for judging whether "0" is set or not as the transfer interval and extra control means for the case may be prepared, but this causes new problems such as an increase of the hardware quantity and the like.

SUMMARY OF THE INVENTION

The present invention has been devised in order to solve such problems as above in the interval control function of the transfer clock of the serial data transfer apparatus, and the object thereof is to provide a serial data transfer apparatus capable of moving from a transfer interval counting period to a transfer clock output period at the transfer interval "0".

Figure 6:
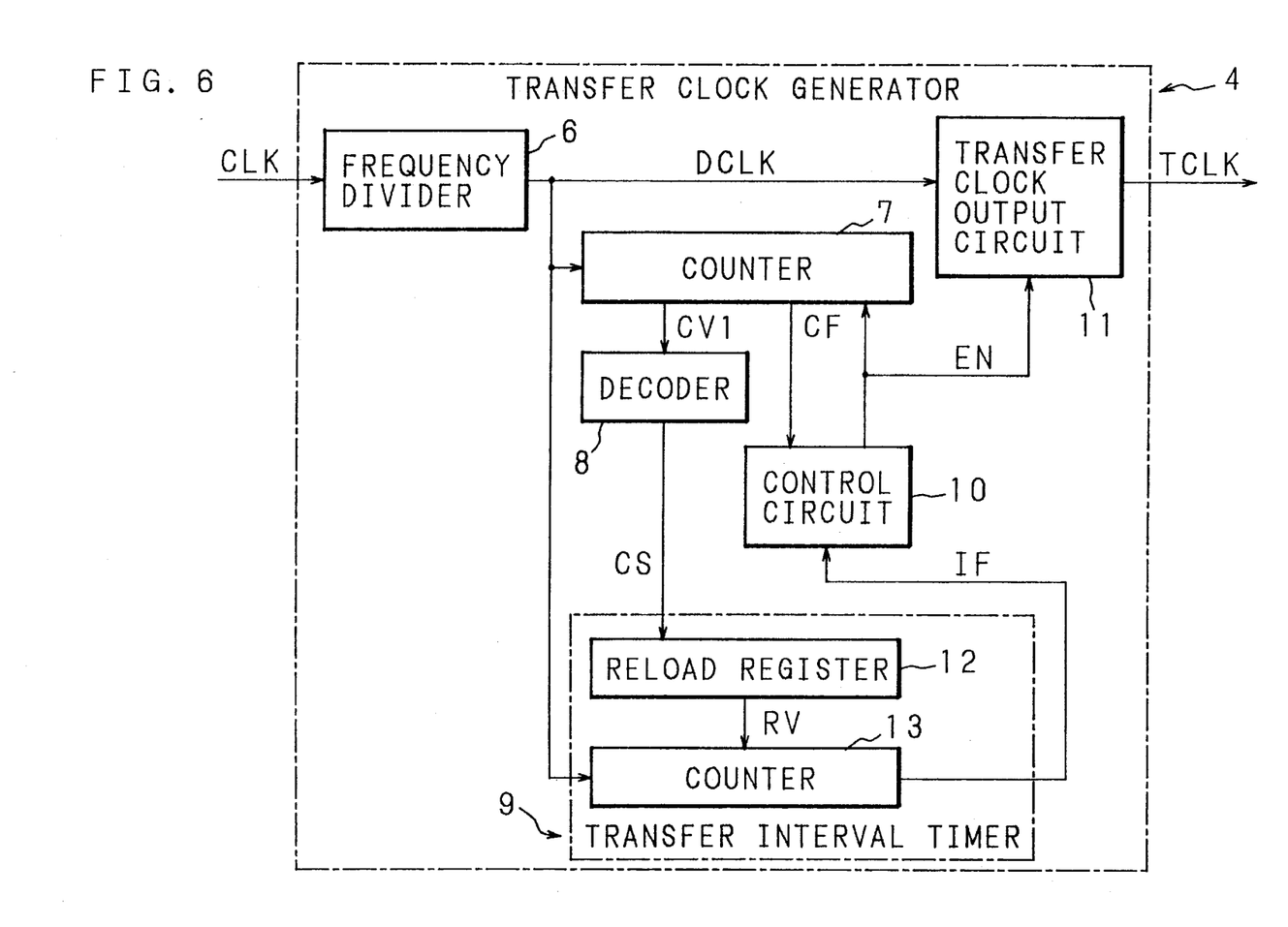
FIG. 6 is a block diagram showing a first embodiment of a transfer clock generator of a serial data transfer apparatus of the invention.
Figure 7A:
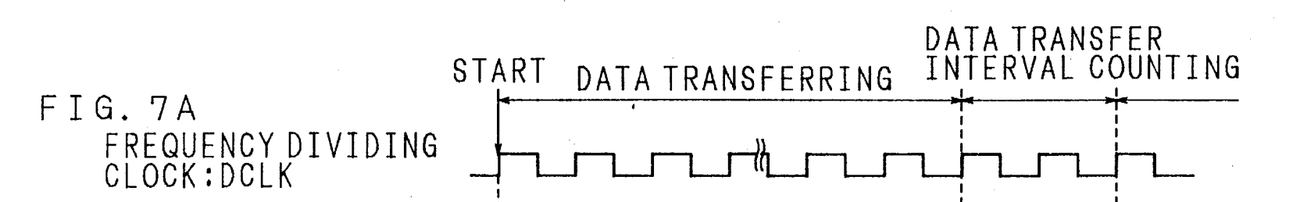
FIGS. 7(a) to 7(e) are timing charts showing an operation example of the first embodiment of the transfer clock generator of the serial data transfer apparatus of the invention.
Figure 7B:
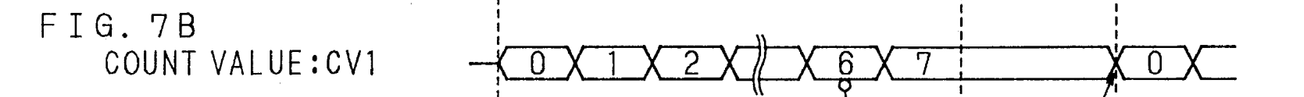
Figure 7C:
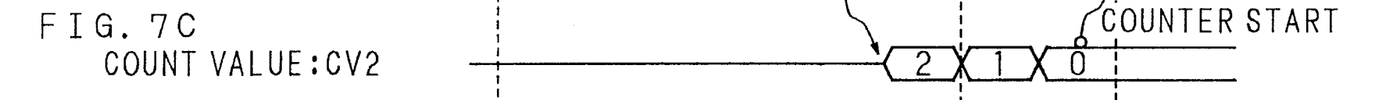
Figure 7D:
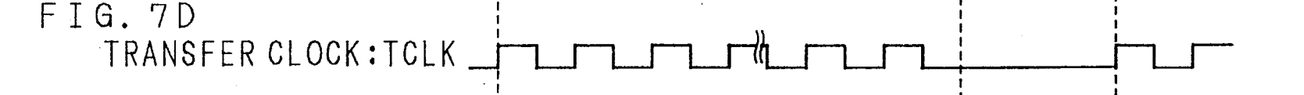
Figure 7E:
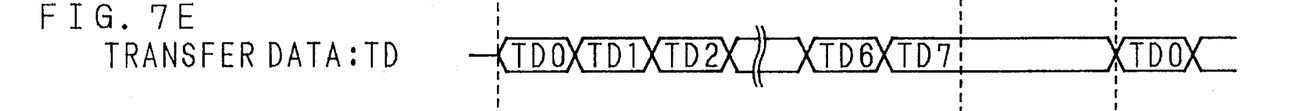
Figure 8A:
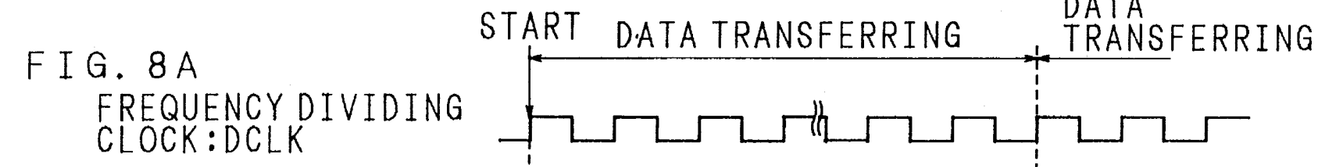
FIGS. 8(a) to 8(e) are timing charts showing another operation example of the first embodiment of the transfer clock generator of the serial data transfer apparatus of the invention.
Figure 8B:
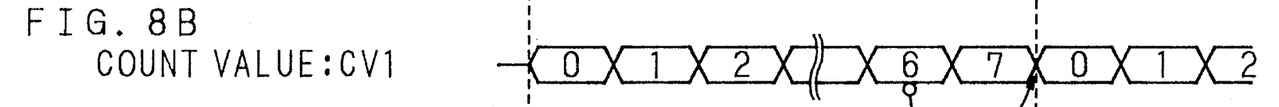
Figure 8C:
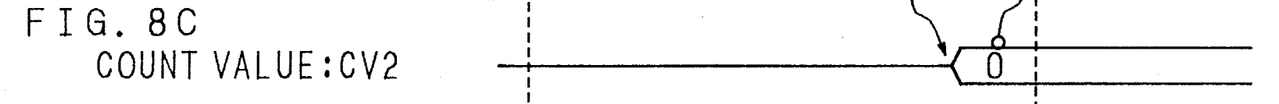
Figure 8D:
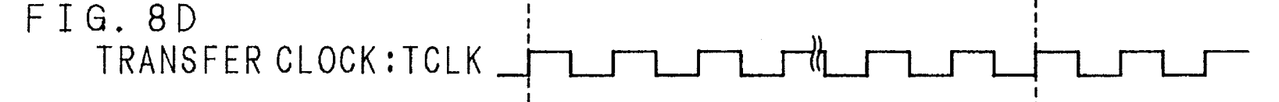
Figure 8E:
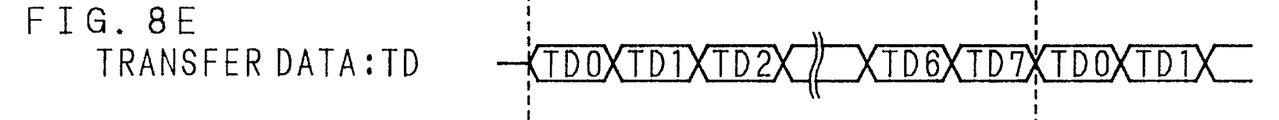

As shown in FIG. 6, the serial data transfer apparatus of the invention is provided with a decoder 8 which detects, when the count value of the counter 7 becomes a value of one clock pulse before the count finish, and makes the transfer interval timer 9 start counting the transfer interval count at the next clock pulse timing, that is, at the timing of the last clock pulse of the transfer clock pulses, and with control circuit 10 which actuates the counter 7 and the transfer clock output circuit 11 at the timing of the next clock pulse when the transfer interval timer 9 finishes counting.

In the serial data transfer apparatus of the invention, the transfer interval timer 9 starts counting the transfer intervals at the timing of the last clock pulse of the transfer clock pulses, and the transfer clock output circuit 11 starts outputting the transfer clock pulses at the timing of the next clock pulse after the transfer interval timer 9 finishes counting of the transfer intervals.

The above and further objects and features of the invention will more fully be apparent from the following detailed description with accompanying drawings.

DESCRIPTION OF THE PREFERRED EMBODIMENTS

In the following, explanation will be made on the invention referring to the drawings showing the embodiments thereof.

[First Embodiment]

FIG. 6 to FIG. 8(e) are the drawings showing the first embodiment of the invention. The state where the serial data transfer apparatus of the invention is connected at the transmit side with the serial data transfer apparatus at the receiving side is the same as that shown in the block diagram in the aforementioned FIG. 1. The whole configuration of the serial data transfer apparatus of the invention is the same as the block diagram shown in FIG. 2 above.

FIG. 6 is a block diagram showing a more specific configuration example of the transfer clock generator 4 of the serial data transfer apparatus of the invention.

In FIG. 6, reference numeral 6 designates a frequency divider which inputs and divides reference clock pulses CLK and generates frequency dividing clock pulses DCLK. In addition, the reference clock pulses CLK are generated by a clock generator (not shown). The frequency dividing clock pulses DCLK generated by the frequency divider 6 are fed to the transfer clock output circuit 11, the counter 7 and the transfer interval timer 9.

The counter 7 counts the frequency dividing clock pulses DCLK, outputs the count value CV1 to a decoder 8, and outputs the count finish signal CF to a control circuit 10, to be described later, at the time of count finish.

The decoder 8 always decodes the count value CV1 given from the counter 7, and when it decodes a value of one clock pulse before the count finish, it outputs the transfer interval count start signal CS which actuates the transfer interval timer 9 at the last cycle of the next counter operation of the counter 7 to the transfer interval timer 9.

The transfer interval timer 9 is composed, more specifically, of the reload register 12 and the counter 13. The transfer interval count start signal CS outputted from the decoder 8 is inputted to the reload register 12, and the frequency dividing clock pulses DCLK outputted from the frequency divider 6 are inputted to the counter 13.

The counter 13 of the transfer interval timer 9 counts the transfer interval of the transfer clock pulses TCLK by counting the frequency clock pulses DCLK. Specifically, the counter 13 of the transfer interval timer 9 is constructed as a down counter, and the reload register 12 loads the load value RV held in advance to the counter 13 when the transfer interval start signal CS is given from the decoder 8. The counter 13 of the transfer interval timer 9 counts down with the reload value RV as an initial value, and when the count value CV2 becomes "0", it provides a transfer interval count finish signal IF to the control circuit 10.

When the transfer interval count finish signal IF is provided from the counter 13 of the transfer interval timer 9, the control circuit 10 provides the output enable signal EN, which allows the counter 7 to start counting and the transfer clock output circuit 11 to start outputting the transfer clock pulses TCLK.

When the output enable signal EN from the control circuit 10 is enabled, the transfer clock output circuit 11 outputs the transfer clock pulses TCLK in accordance with the frequency dividing clock pulses DCLK from the frequency divider 6.

Next, an explanation will be given of the interval control of the transfer clock pulses in accordance with the configuration shown in aforementioned FIG. 6, referring to the timing charts of FIGS. 7 (a) to 7 (e) and FIGS. 8(a) to 8(e).

In the timing charts in FIGS. 7(a) to 7(e) and FIGS. 8(a) to 8(e), reference character DCLK shows the waveform of the frequency dividing clock pulses DCLK, character CV1 the count value of the frequency dividing clock pulses DCLK by the counter 7, CV2 the count value of the frequency dividing clock pulses by the counter 13 of the transfer interval timer 9, TCLK the waveform of the transfer clock pulses, and TD the transfer data.

The explanation will be made with the assumption that the counter 7 is an 8-clock counter of length 3-bits and the counter 13 of the transfer interval timer 9 is a down counter.

At first, explanation will be made on the case where the transfer interval is "2", referring to the timing chart of FIGS. 7(a) to 7(e).

Counting of the frequency dividing clock pulses DCLK is started by the counter 7, and the transfer clock pulses TCLK are outputted from the transfer clock output circuit 11. Since the counter 7 counts from "0" and finishes at "7", the decoder 8 outputs the transfer interval count start signal CS to the transfer interval timer 9 at the time when the count value CV1 of the counter 7 becomes "6".

In the transfer interval timer 9, when the transfer interval start signal CS is inputted to the reload register 12, "2" is loaded as a reload value from the reload register 12 to the counter 13. Thereby, the counter 13 starts counting the transfer interval value from the next clock pulse of the frequency dividing clock pulses DCLK.

At this time, the counter 7 outputs the count finish signal CF to the control circuit 10. Upon receiving the count finish signal CF, the output enable signal, which is fed to the transfer clock output circuit 11 and to the counter 7 is disabled. This enables the counter 7 to stop the counting operation of the frequency dividing clock pulses DCLK and the transfer clock output circuit 11 to stop the output operation of the transfer clock pulses TCLK.

In the transfer interval timer 9, the count value CV2 of the counter 13 is counted down from "2". When the count value CV2 becomes "0", the transfer interval count finish signal IF is outputted to the control circuit 10.

The control circuit 10 enables the output enable signal EN when it receives the count finish signal CF from the counter 7 in advance and the transfer interval count finish signal IF from the counter 13.

In such a way, when the control circuit 10 enables the output enable signal EN, the counter 7 starts to count the frequency dividing clock pulses DCLK again, and the transfer clock output circuit 11 starts to output the transfer clock pulses TCLK again.

The transfer interval of the transfer data TD can be made "2" by such operation of the transfer clock generator 4 as above.

In the same way, referring to the timing charts in FIGS. 8(a) to 8(e), explanation will be made on the case where the transfer interval is "0", that is, the case where the transfer clock pulses TCLK are outputted successively.

At first, the counter 7 counts the frequency dividing clock pulses DCLK, and when the count value CV1 of the counter 7 becomes "6", the transfer interval counter start signal CS is outputted to the transfer interval timer 9.

In the transfer interval timer 9, when the transfer interval count start signal CS is inputted to the reload register 12 from the decoder 8, "0" is loaded as a reload value RV from the reload register 12 to the counter 13 at the last clock pulse of the transfer clock pulses TCLK. Thereby, the counter 13 starts counting the transfer interval value from the next clock pulse of the frequency dividing clock pulses DCLK. At this time, however, since the count value of the counter 13 of the transfer interval timer 9 is "0", the transfer interval count finish signal IF is outputted from the counter 13 to the control circuit 10.

The counter 7 outputs, since the count value CV1 of itself becomes the last clock pulse, the count finish signal CF to the control circuit 10.

The control circuit 10 enables the output enable signal EN to start the cycle of the next transfer clock pulses TCLK when it is given the count finish signal CF and the transfer interval count finish signal IF. By the fact that the output enable signal EN becomes enabled, the counter 7 starts counting the frequency dividing clock pulses DCLK, and the transfer clock output circuit 11 starts outputting the transfer clock pulses TCLK.

According to such an operation of the transfer clock generator 4, it becomes possible to make the transfer interval of the transfer data TD becomes "0", in other words, to output the transfer clock pulses TCLK successively.

[Second Embodiment]

Figure 9:
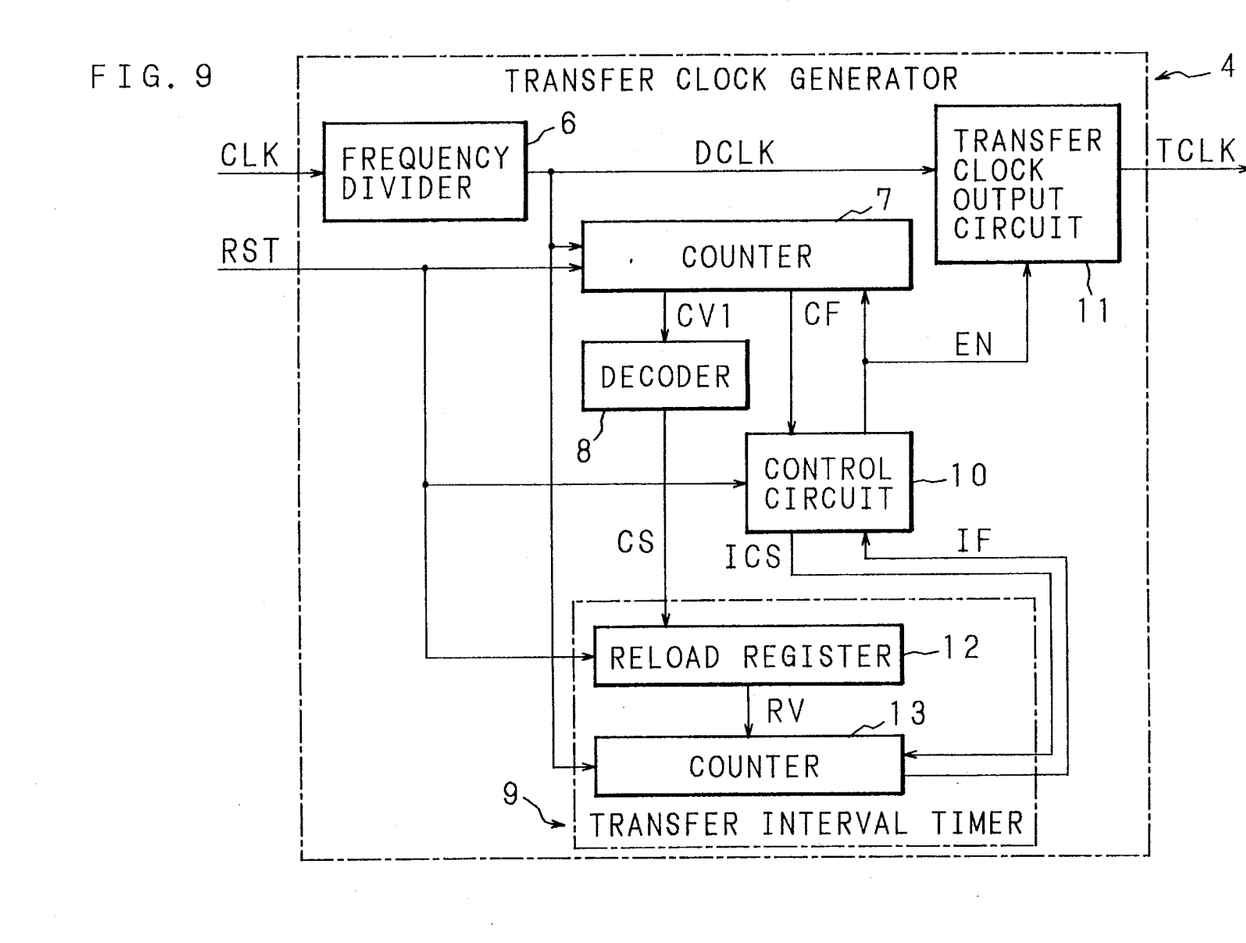
FIG. 9 is a block diagram showing a second embodiment of the transfer clock generator of the serial data transfer apparatus of the invention.

FIG. 9 is a block diagram showing a configuration example of the transfer clock generator 4 of the second embodiment of the serial data transfer apparatus of the invention.

The difference of the second embodiment shown in FIG. 9 from the aforementioned first embodiment is that a reset signal RST is given to the counter 7, the control circuit 10, and to the reload register 12 of the transfer interval timer 9. A transfer interval timer control signal ICS is given to the transfer interval timer 9 from the control circuit 10. When the transfer interval timer control signal ICS is effective, it allows the counter 13 of the transfer interval timer 9 to permit counting, and when it is disabled, it stops the counter 13 from counting.

In addition, when the reset signal RST is enabled, the control circuit 10 feeds the output enable signal EN to the counter 7 and to the transfer clock output circuit 11, so as to stop the counting operation of the counter 7, as well as to stop the output of the transfer clock pulses TCLK from the transfer clock output circuit 11.

Since the other features of the configuration are the same as that of the aforementioned first embodiment, explanation thereof will be omitted.

In such a second embodiment of the serial data transfer apparatus of the invention, after the counter 7 starts counting of the frequency dividing clock pulses DCLK, and the transfer clock output circuit 11 starts outputting the transfer clock pulses TCLK, the output of the transfer clock pulses TCLK stops when the reset signal RST is given.

The count value CV1 of the counter 7 is initialized to "0" when the counter 7 is given the reset signal RST, and the reload value RV of the reload register 12 is loaded to the counter 13 of the transfer interval timer 9 to be initialized.

In the following, explanation will be given for the four cases.

The first case is one in which the transfer clock output circuit 11 is outputting (when the counter 7 is in counting operation) the transfer clock pulses TCLK. In this case, the output enable signal EN fed from the control circuit 10 to the counter 7 and to the transfer clock output circuit 11 becomes ineffective when the reset signal RST is activated. Thereby, the transfer clock output circuit 11 stops outputting the transfer clock pulses TCLK. At the same time, the count value CV1 of the counter 7 is reset to "0", and the counter 13 of the transfer interval timer 9 is also reset to "0".

Accordingly, when the reset state is released, the transfer clock generator 4 immediately starts outputting the transfer clock pulses TCLK.

The second case is one where the last clock pulse of the transfer clock pulses TCLK is being outputted. In this case, the facts that the output enable signal EN outputted to the counter 7 and the transfer clock output circuit 11 from the control circuit 10 becomes disabled and that the transfer clock output circuit 11 stops outputting of the transfer clock pulses TCLK for the reason that the reset signal RST is given, are the same as in the first case. But, in this second case, since also the transfer interval timer control signal ICS which is given to the transfer interval timer 9 becomes ineffective, the transfer interval timer 9 stops counting. Therefore, the transfer interval timer 9 does not output the transfer interval count finish signal IF, and the counter 13 of the transfer interval circuit 9 is reset and the reload value RV is loaded from the reload register 12.

Accordingly, in the same way as in the first case, when the reset state is released, the transfer clock generator 4 is immediately in the state where the transfer clock pulses TCLK can be outputted.

The third case is one where the transfer interval timer 9 is being operated. In this case, the transfer clock output circuit 11 does not output the transfer clock pulses TCLK because the output enable signal EN from the control circuit 10 becomes disabled. However, in the same way as in the second case, since the transfer interval timer control signal ICS given to the transfer interval timer 9 also becomes disabled, the operation of the transfer interval timer 9 is stopped.

Accordingly, in the same way as in the second case, when the reset state is released, the transfer clock generator 4 is immediately in the state where the transfer clock pulses TCLK can be outputted.

The fourth case is one where the transfer interval timer 9 finishes counting of the transfer interval and the transfer interval count finish signal IF is outputted. In this case, the control circuit 10 is in the stage where it outputs the output enable signal EN which makes the output of the transfer clock pulses TCLK from the transfer clock output circuit 11 become enabled by the transfer interval count finish signal IF. But since the output enable signal EN is not to be given to the counter 7 and to the transfer clock output circuit 11 when the reset signal RST is fed to the control circuit 10, the next transfer clock pulse TCLK is not outputted from the transfer clock output circuit 11.

Accordingly, in the same way as in each case aforementioned, when the reset state is released, the transfer clock generator 4 is immediately in the state where the transfer clock pulses TCLK can be outputted.

As described above, according to the serial data transfer apparatus of the invention, in the transfer clock generator 4, the timing at which the transfer interval timer 9 starts counting the frequency clock pulses DCLK is made, the timing at which the counter 7 counts the last clock pulse of the transfer clock pulse TCLK. Therefore, since the transfer interval timer 9 counts the frequency dividing clock pulses DCLK "n" number of times in the present invention, instead of counting the clock pulses DCLK "n+1" number of times as is done in the prior art, it becomes impossible to generate the transfer interval "0", that is, the transfer clock pulses TCLK successively.

Also, since the transfer interval timer 9 after release of the reset state enters a state where transfer interval counting is finished by initializing the transfer interval timer 9 at the time when the reset signal RST is inputted, quick response can be performed at the output of next transfer clock pulse TCLK.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to the embraced by the claims.

What is claimed is:

1. A serial data transfer apparatus which transfers signal of each bit of data consisting of a predetermined number of bits as a unit successively in synchronism with clock pulses of a clock signal, comprising:

first counting means for counting the number of clock pulses of said clock signal necessary for transferring a unit of data;

second counting means for counting with the number of clock pulses of said clock signal the interval between the transfer of the unit of data and the transfer of the next unit of data;

storing means for storing the number of clock pulses to be counted by said second counting means;

first control means for setting the number of clock pulses stored in said storing means at the time point when the count value of said first counting means becomes a value of one clock pulse before the number of clock pulses necessary for transferring the unit of data, so as to make the number of clock pulses of said clock signal start to be counted;

clock outputting means for outputting clock pulses of said clock signal as clock pulses for data transfer; and second control means for controlling said clock outputting means to stop outputting of clock pulses at the time when said first counting means has counted the number of clock pulses of said clock signal necessary for transferring the unit of data, and for controlling said clock outputting means to start outputting of clock pulses at the time when said second counting means has counted the number of clock pulses stored in said first storing means.

2. A serial data transfer apparatus as set forth in claim 1, wherein, a reset signal is given to said second control means, said first count means and said storing means, said second control means stops the operations of said first counting means, said second counting means and said clock outputting means when said reset signal is given, and said first counting means and said second counting means initialize the count values of the number of clock pulses of said clock signal respectively when said reset signal is given.

* * * * *